INVENTOR.
JOHN M. CHAMBERS
BY
Carlson, Pitzner, Hubbard & Wolfe
ATTORNEYS

April 8, 1952　　　J. M. CHAMBERS　　　2,592,393
PUMP AND MOTOR HYDRAULIC SYSTEM FOR USE ON TRACTORS
Filed March 24, 1949　　　4 Sheets-Sheet 3

INVENTOR.
JOHN M. CHAMBERS
BY
Carlson, Pitzner, Hubbard & Wolfe
ATTORNEYS

April 8, 1952   J. M. CHAMBERS   2,592,393
PUMP AND MOTOR HYDRAULIC SYSTEM FOR USE ON TRACTORS
Filed March 24, 1949   4 Sheets-Sheet 4

INVENTOR.
JOHN M. CHAMBERS
BY
Carlson, Pitzner, Hubbard & Wolf
ATTORNEYS

Patented Apr. 8, 1952

2,592,393

UNITED STATES PATENT OFFICE 2,592,393

PUMP AND MOTOR HYDRAULIC SYSTEM FOR USE ON TRACTORS

John M. Chambers, Leamington Spa, England, assignor to Harry Ferguson, Inc., Detroit, Mich., a corporation of Delaware Application March 24, 1949, Serial No. 83,253

6 Claims. (Cl. 60—52)

The present invention pertains to tractors having an hydraulic power lift device and more particularly to improvements in the manually controlled hydraulic system thereof.

The general air of the present invention is to provide a tractor hydraulic system having improved valve means for controlling both a power lift device and an auxiliary hydraulic actuator.

It is a primary object of the present invention to provide an improved hydraulic arrangement for effecting more stable and positive positioning of an auxiliary actuator and to enable the same to be more easily and precisely controlled by the tractor operator. It is an object allied with the above to provide an hydraulic valve which is particularly suitable for control of implement-mounted auxiliary actuators requiring positive positioning and yet capable of a rapid thrust in both directions.

It is another object to provide an improved control valve which is inherently well suited for attachment to existing tractor hydraulic systems, which is simple and inexpensive to manufacture and install, and which is automatically operable by the same control lever with which tractor owners are already familiar.

Further objects and advantages of the invention will become apparent as the following description proceeds, taken in connection with the accompanying drawings, in which.

Figure 1:
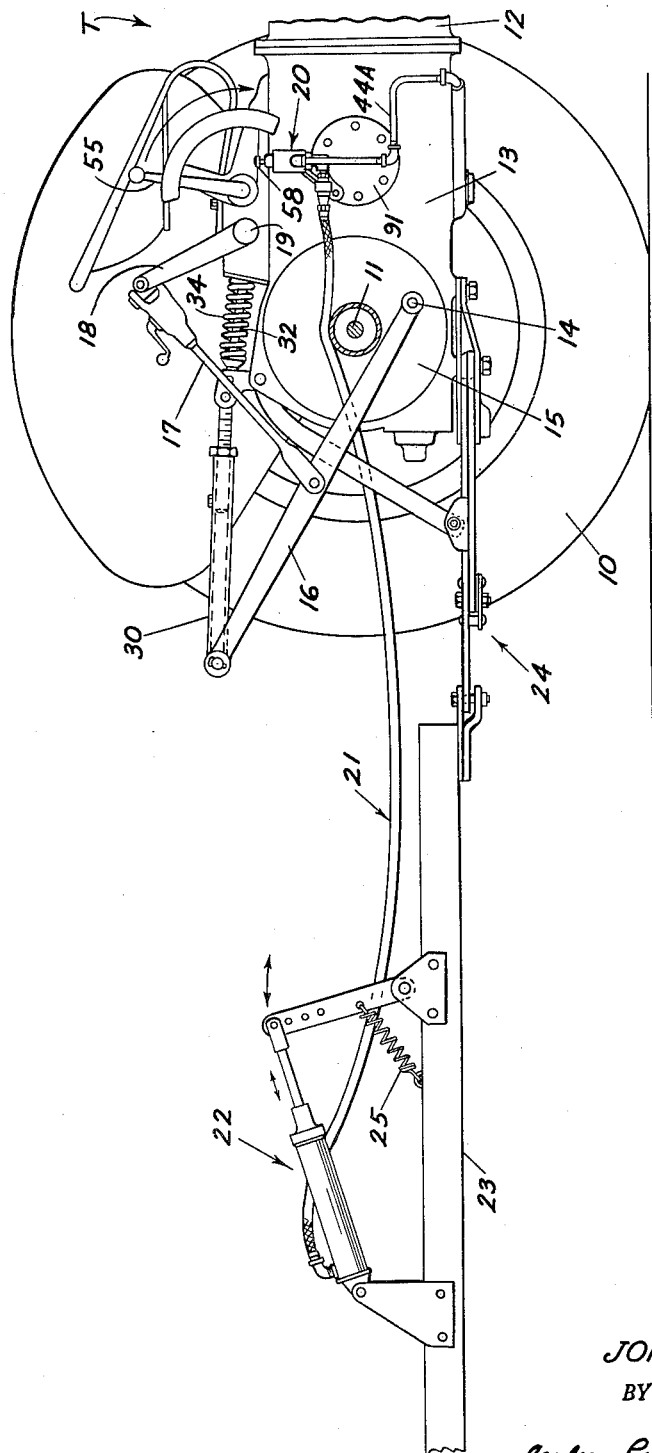
Figure 1 is a fragmentary side elevation of the rear portion of a tractor and connected implement, the near rear wheel of the tractor being removed in order to show the mounting arrangement for the valve disclosed herein.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention herein illustrated, the tractor indicated at T in Fig. 1 has a pair of pneumatically tired rear wheels 10 carried by a rear axle 11 which is driven by an engine (not shown) and suitable transmission housed within a transmission casing 12. Rearwardly of the latter is the tractor rear end housing 13. Universally pivoted at 14 on opposite sides of the rear end housing are a pair of laterally spaced hitch links 16. These hitch links are preferably fashioned in the form of heavy steel bars and their pivots 14 are desirably located forwardly of, and below, the rear axle 11.

The hitch links 16 are normally arranged to be swung vertically for raising and lowering a detachably connected implement, such raising and lowering of the hitch links being accomplished by means of an hydraulic apparatus powered from the tractor and incorporated in the same. As illustrated, the hitch links 16 are sustained by drop links 17 from cranks 18 rigid with a transverse rock shaft 19. This rock shaft is rotatable for forceful lifting of the drop links 17 by a main piston and cylinder which is internally included and to which more detailed reference will later be made.

In utilizing the invention in one of its aspects, the hydraulically raised hitch links 16 are secured by anchoring the outer end thereof to the tractor by means of an anchoring link or strut 30. In the preferred embodiment the anchoring link 30 is attached to a push rod 32 which extends within the rear end housing and which works against a relatively stiff control spring 34. Detailed understanding of the function of the link 30 and the mechanism associated with the push rod 32 is not necessary for an appreciation of the present invention and reference may be made to the copending Bunting patent application Serial No. 226 filed January 2, 1948, for further details. Suffice it to say that inward movement of the rod 32 against the biasing force of spring 34, and upon reaching a predetermined point in its path of movement, causes operation of an hydraulic control valve tending to cut off the flow of hydraulic fluid. As a result, pressure may be maintained in the system at a predetermined magnitude.

By way of introduction to the present invention, an auxiliary valve assembly indicated generally at 20 is provided which is effective to transmit hydraulic fluid to, and to exhaust fluid from, an auxiliary piston and cylinder actuator 22 via a conduit 21. Preferably, the actuator is located on a trailed implement 23 having a spring 25 or equivalent biased member tending to urge the actuator into its collapsed condition. The implement 23 may be connected to the tractor by any desired means such as the swinging drawbar type of hitch indicated at 24.

Figure 4:
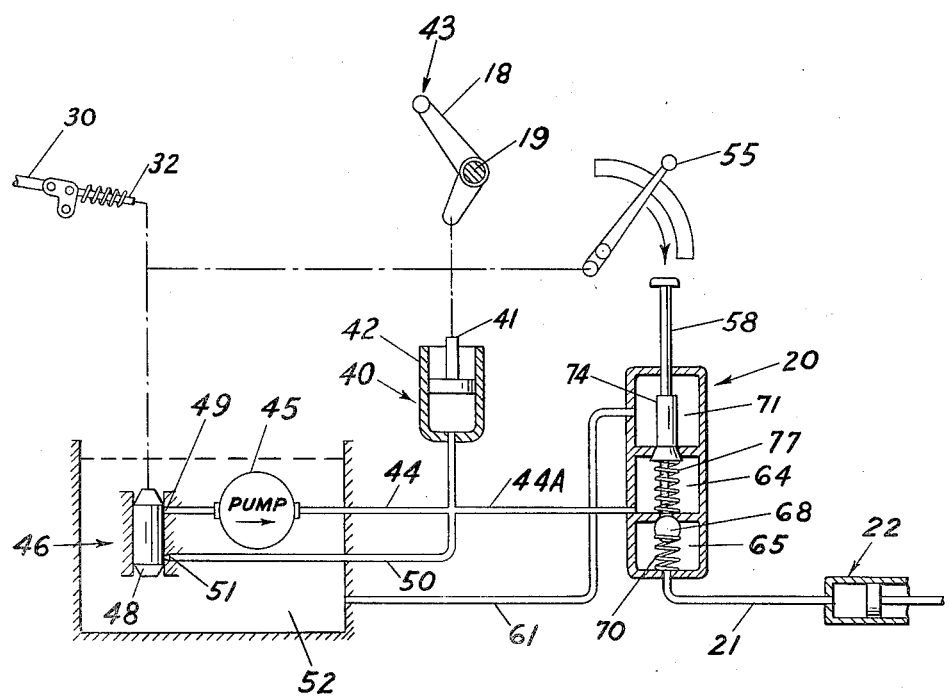
Fig. 4 is a schematic layout of the hydraulic system for the tractor shown in Fig. 1.

To understand the novel relationship between the auxiliary valve and actuator to the remainder of the system, consideration may next be given to the schematic layout of Fig. 4. Here it will be noted that the main actuator 40 includes a piston 41 which is connected to the cranks 18 and a cylinder 42 connected to an input line 44. The cranks 18 are subjected to load, as indicated diagrammatically in this figure and as represented by the link 30 (Fig. 1) acting in compression. Pressure fluid is supplied to the line 44 by a pump 45 preferably driven from the tractor engine and the input of which is controlled by means of a main control valve 46.

Since the pressure head in the system is determined by the load imposed on the system, and since the load on the auxiliary actuator must be less than that on the main actuator, it will be evident that the load on the cranks may be used to limit the maximum possible pressure head in the system to any value up to that determined by the conventional safety release valve in the system. The diagrammatically illustrated load 43 (Fig. 4) represents such a limiting factor, and it may have such a value as to prevent substantially any movement of piston 41. The load represented by the link 30 in Fig. 1, on the other hand, is such as to permit movement of the piston under an applied load as explained above and in the aforesaid Bunting application.

The control valve 46 has a three-position plunger 48 which in Fig. 4 is shown in its central or neutral position. When the plunger is moved downwardly from the position of Fig. 4, an intake passage 49 for the pump 45 is uncovered so that the pump begins delivering fluid by way of the line 44 into the main actuator 40. On the other hand, when the valve plunger 48 is moved upwardly from the position of Fig. 4, the pump intake 49 remains closed but a drain line 50 is opened permitting fluid to exhaust slowly through a restricted orifice 51 into a suitable sump or reservoir 52.

The plunger 48 is positioned jointly by the rod 32 and by a manually rockable control or quadrant lever 55. Movement of the latter downwardly in the direction of the arrow causes the valve plunger 48 to be shifted endwise away from its neutral position into its exhaust position just as called for in the application above referred to.

In practicing the present invention the pressure side of the system, here the fluid supply line 44, is connected to the auxiliary line 21 by means of a check valve in the valve assembly 20. Such check valve, comprising a ball 68 and a spring 70 (Fig. 4) is so arranged as to enable pressure fluid to flow into the hydraulic actuator 22 but to normally seal the same against reverse flow. The check valve is preferably further arranged so that it is disabled to permit reverse flow as an incident to the quadrant control lever 55 moving into the end of its range of movement in the downward or exhaust direction. Means are also included within the valve assembly 20 so that upon full downward movement of the lever 55 there is direct and unobstructed discharge of the line 44 and the actuators 22, 40 to the sump 52.

Figure 2:
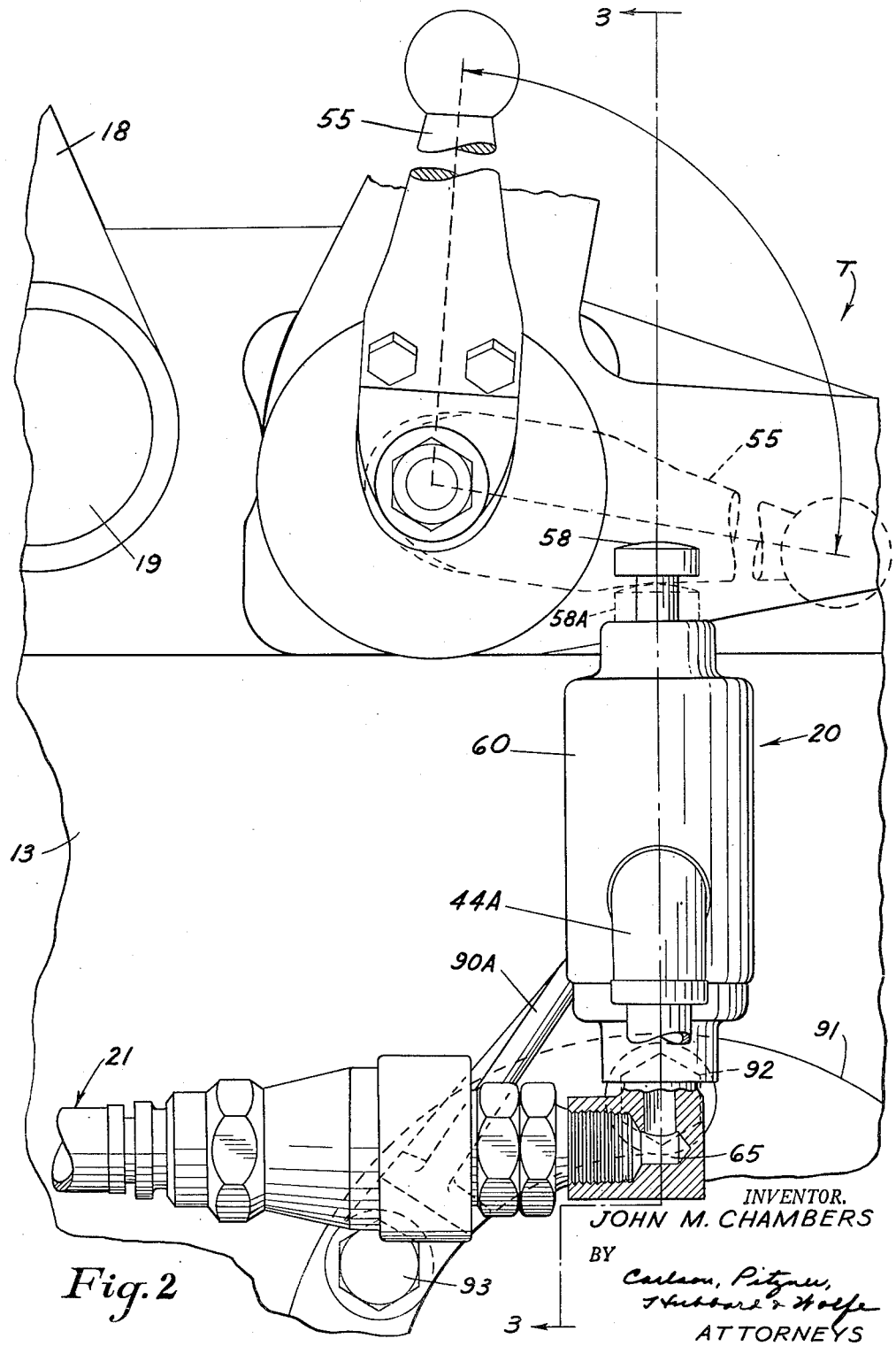
Fig. 2 is an enlarged external view of the valve showing its association with the main quadrant lever.
Figure 3:
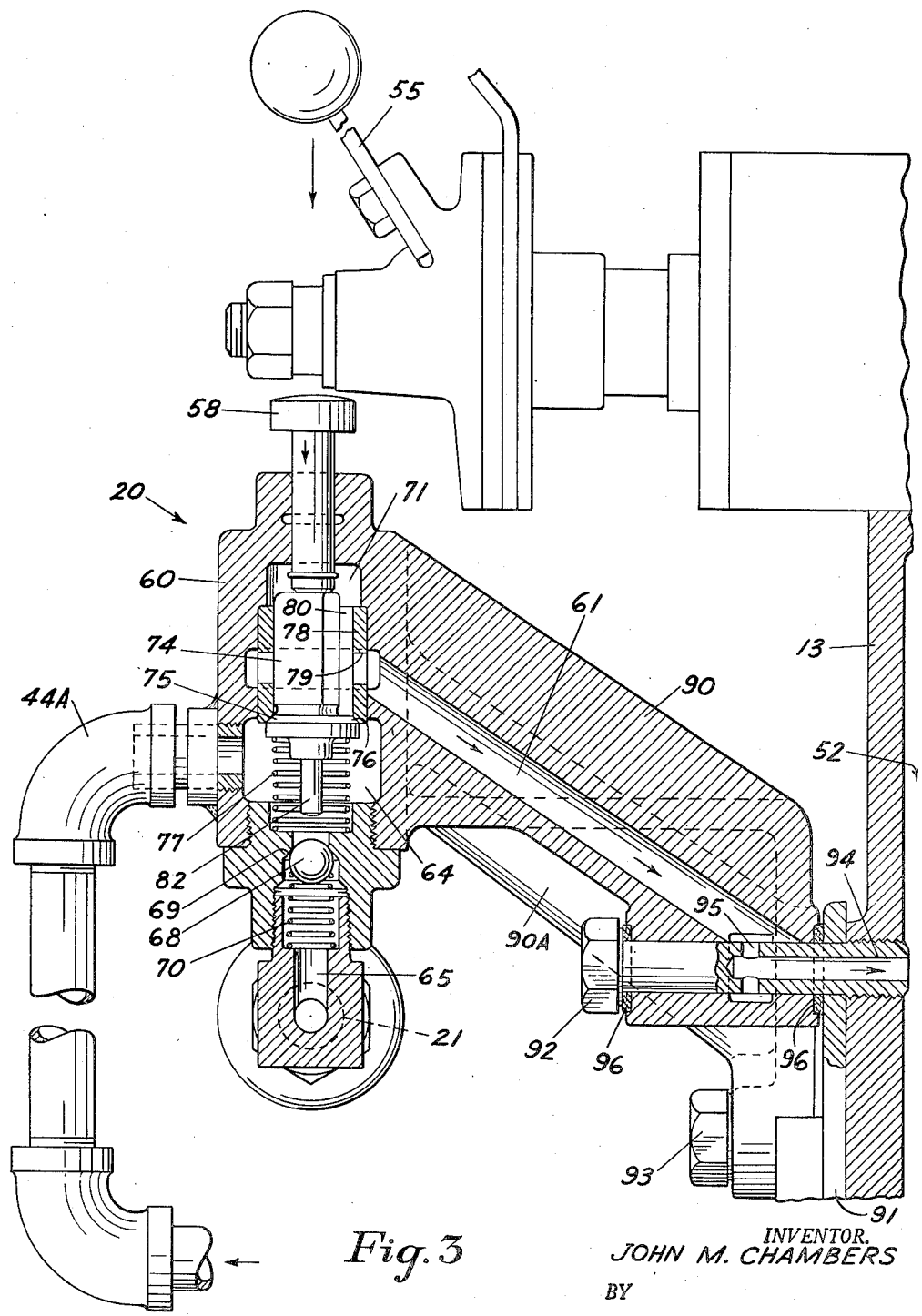
Fig. 3 is a vertical section of the improved valve structure taken along the line 3—3 of Fig. 2.

Referring to the construction of the valve assembly 20 in greater detail as disclosed in Figs. 2 and 3, it will be seen that it includes a body 60 to which are connected an input conduit 44A and an exhaust line 61, in addition to the pressure outlet line 21 previously referred to. In the preferred construction the valve body 60 is provided with three chambers. Fluid is supplied under pressure to a central chamber 64 through the portion 44A of the supply line 44. During expansion of the remote actuator 22, fluid flows from the central chamber 64 to a lower chamber 65 which leads into the flexible conduit 21. Between the chambers 64 and 65 is a seat 69 for the ball check valve 68, 70 previously referred to. Alined with the check valve is an operating plunger 58 having a tip portion 82 which causes unseating of the check valve when the quadrant lever 55 is fully depressed. With the actuator 22 biased as shown, a reverse flow of fluid will take place thus restoring the actuator to its initial collapsed condition.

Located above the central chamber 64 is a third chamber 71 having connection to the exhaust line 61 leading to the sump 52. Arranged between the chambers 64, 71 and connected for sliding movement with the operating plunger 58 is a valve plunger 74 presenting an upwardly tapered face 75 which seats against a mating valve seat 76. A biasing spring 77 keeps the faces in normal sealing engagement. Preferably, the valve seat 76 is machined on a tubular insert 78 having an outlet port 79 therein, the valve plunger 74 being cut away at 80 (on the right-hand side in Fig. 3) to permit the flow of fluid past the valve faces 75, 76 and into the exhaust line 61. It will be apparent then that when the quadrant lever is moved downwardly into its exhaust position and into the position shown dotted in Fig. 2, the valve plunger 74 is depressed against the force of bias of the spring 77 to produce a large escape orifice for the fluid in the chamber 64. Under such condition both of the actuators 22, 40 are rapidly "dumped."

With the above structure clearly in mind, a number of important and rather unobvious advantages may be perceived. In the first place it is possible to lock the auxiliary actuator in a desired extended condition for any length of time merely by moving the quadrant lever 55 upwardly until the required extension is attained and then moving it downwardly beyond the neutral point of the valve 46 and to any point short of contact with the plunger of the valve assembly 20. This range is considerable and no skill or "feel" is required. The latter is to be contrasted with prior art tractor systems including auxiliary actuators in which it is necessary to juggle the quadrant lever to find the position which restores the valve 48 precisely to its neutral or centered condition. Such juggling takes considerable skill and experience on the part of the operator, not to mention the additional time required for trial and error manipulation. Even when a substantially neutral position is reached, it is found in the normal case that sufficient leakage takes place to cause the actuator piston to creep slowly in one direction or the other from its set position. In the present system, on the other hand, the positioning is stable and constant. No resetting is necessary even when the quadrant lever is accidentally jarred, provided it stays within the above-mentioned limits. The pump may even be turned off and on without affecting the actuator position.

Upon lowering the quadrant lever all the way and into engagement with the plunger 58, two things occur almost simultaneously. In the first place the ball 68 is displaced from its seat 69, allowing pressure fluid to escape into the chamber 64. In addition, the opening of the valve faces 75, 76 provides a path for the pressure fluid through the line 61 to the sump. Since this path is substantially free and uninterrupted, the actuator 22, under the influence of the spring 25 or other biasing force, is enabled to collapse almost immediately.

In accordance with one of the more detailed aspects of the invention, it will be noted that the valve includes features making it extremely simple to apply to existing tractors. Thus, as shown in Figs. 2 and 3, it is seen that the valve body 60 is formed integrally with a supporting bracket 90 which extends downwardly at an angle for attachment to the housing 13. The bracket 90 is fastened to the tractor adjacent an access plate 91 by means of bolts 92, 93 which engage tapped holes originally provided in the bolt circle.

In order to steady the valve body from rotation in a fore and aft direction, the bracket includes a rearwardly extending arm or offset portion 90A which is shown in profile in Fig. 2. A second fastening bolt 93 is employed at the end of this arm. The durability and rigid mounting of the valve combined with ease of accessibility make it a very convenient source of pressure fluid for operating any desired type of hydraulic pressure device.

To make it unnecessary to connect a separate line between the valve and sump, the bracket 90 in the present embodiment includes a hollow channel, and the bolt 92 is also hollow and in fluid communication therewith. With regard to the details of the bolt 92, it will be noted that it is centrally bored at 94 and includes a transverse hole 95, both of the latter being sufficiently large that a discharge to the sump may be considered as substantially unobstructed. Gaskets 96 under the head of the bolt and between the bracket 90 and the access plate 91 insure that there will be no leakage.

It will be apparent to one skilled in the art that the invention is by no means to be limited to the specific structure disclosed for disabling the check valve, but would also include modifications in which the ball check valve is disabled by passing it by any desired type of manually operated valve to effect dumping of the auxiliary actuator.

I claim as my invention:

1. In an attachment for a tractor having an hydraulic power lift unit thereon including a main actuator and an engine-driven pump for supplying pressure fluid thereto, valve mechanism controlling the pressure fluid supply and a manual control lever movable to shift said valve between two positions for respectively effecting raising and lowering actions of the main actuator; said attachment comprising, in combination, an auxiliary hydraulic actuator, a conduit for connecting said auxiliary actuator to said pump for the reception of fluid in parallel with the main actuator, an exhaust conduit, a check valve interposed between said exhaust conduit and said auxiliary actuator and normally spring biased to closed position, an operating plunger for said check valve operable upon displacement to open such valve, and means for supporting said valve and plunger in position for movement of the latter by the manual control lever as the latter is shifted into a position to effect a lowering action.

2. In a tractor hydraulic system of the type having a piston and cylinder type pressure fluid operated actuator, a pump for supplying fluid under pressure, a fluid storage sump, and means including a valve mechanism and associated manual operator for alternatively initiating the delivery of pressure fluid to said actuator in one portion of its range of movement and for enabling exhaust of pressure fluid from said actuator to said sump in the other portion of its range of movement, the combination comprising: an auxiliary valve having means for clamping on the tractor body in the path of movement of said manual operator, said auxiliary valve having a first chamber connected to the source of pressure fluid and having a second chamber connected directly to said sump, a valve plunger normally biased to shut off flow between said chambers, said plunger being positioned for engagement by said manual operator only upon the movement of the manual operator into its exhaust position and operable thereby for establishing communication between such chambers whereby the source of pressure fluid is connected substantially unobstructedly with said sump.

3. In a tractor hydraulic system of the type having a pressure fluid operated actuator of the piston and cylinder type, a fluid source including a pump for producing fluid under pressure, and means including a manual operator movable between a first position in which pressure fluid is supplied from said pump to said actuator and an exhaust position in which the pressure fluid supply is interrupted and said actuator is gradually exhausted of fluid, the combination comprising: a valve including a body having a valve operator thereon, bracket means for mounting said valve body on said tractor with said operator positioned for movement by said manual operator as the latter moves fully into its exhaust position, a conduit for connecting said actuator to said valve, said bracket having a discharge channel formed integrally therein for substantially unobstructed exhaust of said fluid through said valve and into the tractor, said valve including a member movable with said operator for interconnecting said conduit and said discharge channel.

4. In a tractor having a power lift device thereon, the combination comprising a first piston and cylinder type actuator having a supply line associated therewith, a pump for supplying fluid under pressure to said line, means including a manually operable valve movable into a pressure position to initiate the delivery of pressure fluid to said actuator and alternatively into an exhaust position to allow fluid to bleed from said actuator to a sump, an auxiliary piston and cylinder type actuator connected to said fluid supply line, and an auxiliary valve having a valve plunger therein arranged upon actuation to interconnect said fluid supply line substantially unobstructedly to said sump, the plunger in said auxiliary valve being positioned for actuation by said manual operator when the latter is moved fully into its exhaust position.

5. In a tractor hydraulic system of the type having a main piston and cylinder type fluid operated actuator, a source of fluid under pressure, and means including a manual operator for alternatively initiating the delivery of pressure fluid to said actuator in one portion of its range of movement and for enabling exhaust of pressure fluid from said actuator in the other portion of its range of movement, the combination comprising: an auxiliary hydraulic actuator, a valve having means for clamping on the tractor body in the path of movement of said manual operator, said valve having a first chamber connected to said source of pressure fluid and having a second chamber connected to said auxiliary actuator, a check valve between said chambers arranged to allow flow exclusively in the direction of said auxiliary actuator, and a valve plunger operable upon the movement of said manual operator into its exhaust position for permitting reverse fluid flow between said chambers.

6. In a tractor hydraulic system of the type having a source of pressure fluid, a sump, a pressure fluid conduit, pressure fluid responsive means connected to said conduit, and a manual operator for alternatively initiating the delivery of pressure fluid to said conduit in one portion of its range of movement and for bleeding pressure fluid from said conduit to the sump in the other portion of its range of movement, the combination comprising a hydraulic actuator connected to said conduit, a check valve interposed between said conduit and said actuator to allow flow of pressure fluid to the latter, and means actuated by said manual operator for simultaneously opening said check valve and for providing a direct dumping connection between said pressure conduit and said sump.

JOHN M. CHAMBERS.

REFERENCES CITED

The following references are of record in the file of this patent:

UNITED STATES PATENTS

| Number | Name | Date |
|---|---|---|
| 1,273,618 | Julien et al. | July 23, 1918 |
| 2,213,401 | Lindgren et al. | Sept. 3, 1940 |
| 2,256,144 | Gifford et al. | Sept. 16, 1941 |
| 2,393,405 | Page | Jan. 22, 1946 |